United States Patent
Yun

(10) Patent No.: US 6,469,975 B1
(45) Date of Patent: Oct. 22, 2002

(54) METHOD FOR CONTROLLING SPEED OF SLED MOTOR IN OPTICAL DISK DRIVE

(75) Inventor: Ki-bong Yun, Anyang (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 808 days.

(21) Appl. No.: 08/816,679

(22) Filed: Mar. 13, 1997

(30) Foreign Application Priority Data

Mar. 13, 1996 (KR) .............................................. 96-6647

(51) Int. Cl.$^7$ .............................................. G11B 23/00
(52) U.S. Cl. ...................................................... 369/258
(58) Field of Search ............................... 369/32, 44.27, 369/44.32, 44.25, 258, 267, 32.01; 318/606

(56) References Cited

U.S. PATENT DOCUMENTS

| | | | | |
|---|---|---|---|---|
| 4,672,595 A | * | 6/1987 | Senso | 369/50 |
| 4,680,515 A | * | 7/1987 | Crook | 318/318 |
| 4,745,563 A | * | 5/1988 | Kaku et al. | 364/565 |
| 4,922,513 A | * | 5/1990 | Joichi | 318/254 |
| 5,045,763 A | * | 9/1991 | Kobayashi et al. | 318/270 |
| 5,300,873 A | * | 4/1994 | Otani et al. | 318/807 |
| 5,479,389 A | * | 12/1995 | Ann | 369/47 |
| 5,689,163 A | * | 11/1997 | Ohnishi | 318/603 |

\* cited by examiner

Primary Examiner—Glenton B. Burgess
Assistant Examiner—Tod Kupstas
(74) Attorney, Agent, or Firm—Sughrue Mion, PLLC

(57) ABSTRACT

A method for controlling the speed of a sled motor for an optical disk drive, wherein the sled motor is first driven according to a predetermined target velocity profile stored in a microcomputer. Then, a frequency of a sinusoidal wave output by a Hall-effect sensor is detected and it is determined whether the frequency of the sinusoidal wave is greater or smaller than a predetermined value. The target speed is incremented by a predetermined amount when the frequency of the sinusoidal wave is greater than the predetermined value, and is decremented by the predetermined amount when the frequency of the sinusoidal wave is smaller than the predetermined value.

3 Claims, 6 Drawing Sheets

METHOD FOR CONTROLLING SPEED OF SLED MOTOR IN OPTICAL DISK DRIVE

BACKGROUND OF THE INVENTION

1. Field of the Invention

The present invention relates to a method for controlling the speed of a sled motor of an optical disk drive. More particularly, the present invention relates to a method for controlling the speed of a sled motor of an optical disk drive which uses a velocity profile to control the speed of the sled motor. The present disclosure is based upon Korean Application No. 96-6647, which is incorporated herein by reference.

2. Description of the Related Art

A compact disk (CD) player and a digital video disk (DVD) player are devices for reproducing audio data stored on an optical disk. On the other hand, a CD-ROM drive and a DVD-ROM drive are computer peripheral devices for reproducing digital data stored on an optical disk. The CD-ROM drive and DVD-ROM drive are random access devices, unlike the CD player and the DVD player, and thus make frequent movements to read the data on the disk.

In such an optical disk system in which a rotating speed and a pick-up position need to be accurately controlled while simultaneously maintaining a high speed operation, such as in the CD-ROM drive, system performance is maximized when the sled and spindle servos of the device are accurately controlled and are in appropriate harmony with one another.

FIGS. 1 and 2 show the sled driving shaft 14 and its peripheral devices in the CD-ROM drive. More specifically, FIG. 1 shows the structure of a typical transferring mechanism of a pickup device in a CD-ROM drive, and FIG. 2 shows the relative position of a sled motor and Hall-effect sensor in the CD-ROM drive of FIG. 1.

A first gear 31 is installed at one end of the shaft of a sled motor 41. The first gear 31, a second gear 32, a third gear 33, a fourth gear 34, and a rack-shaped fifth gear 35 are sequentially engaged. Thus, the driving force from the sled motor 41 is sequentially transferred through the first gear 31, second gear 32, third gear 33, fourth gear 34, and fifth gear 35 to the pickup device 13, so that the pick up device 13 moves along the sled driving shaft 14.

A magnetic plate 42, on which a plurality of alternating north and south magnetic poles are formed as illustrated in FIG. 3, is installed on the shaft of the sled motor 41 between the first gear 31 and the sled motor 41. Also, a Hall-effect sensor 44 is installed at a predetermined position on a printed circuit board 43, separated by a predetermined distance from and opposed to the magnetic plate 42. Here, the combination of the magnetic disk 42 and the Hall-effect sensor 44 generates a signal whose frequency is proportional to the rotational speed of the sled motor 41.

FIG. 4 is a block diagram of a circuit for controlling the speed of a sled motor in a typical CD-ROM drive which uses a velocity profile to control the speed of the sled motor. The signal generated by the Hall-effect sensor 51 is amplified by an amplifier 52. A frequency-to-voltage converter 53 receives the amplified signal and converts the frequency of the amplified signal into a voltage to generate a converted voltage signal whose instantaneous value is proportional to the frequency of the received amplified signal. A microcomputer 55 generates a target velocity profile and outputs a target voltage, which represents a target speed, to be lowpass filtered in a lowpass filter (LPF) 56. Then, the converted voltage signal from the frequency-to-voltage converter 53 and the lowpass filtered signal are differentially amplified by being subtracted by a subtractor 57 and amplified by an amplifier and driver 58. Afterwards, the amplified signal drives a sled motor 59, so that the pick-up device moves in a desired manner.

When the CD-ROM drive is in an on-track state rather than a servo-control state, the converted voltage signal from the frequency-to-voltage converter 53 is differentially amplified with the lowpass filtered signal and a tracking error signal, which is output by a tracking error calculator 60 via a lowpass filter (LPF) 61, to drive the sled motor 59.

Thus, in the CD-ROM drive, the signal pulse generated by the Hall-effect sensor is converted into a voltage signal proportional to the frequency of the signal pulse and differentially amplified with a target speed voltage, so that the speed of the sled motor 41 is controlled to be close to the target speed.

Gains of the Hall-effect sensor 44 differ in each CD-ROM apparatus. Generally, the Hall gain depends on the magnetic field intensity of the magnetic plate 42, the sensitivity of the Hall-effect sensor 44, and. the distance between the magnetic plate 42 and the Hall-effect sensor 44, the most critical factor being the distance between the magnetic plate 42 and the Hall-effect sensor 44. If the distance is not adjusted precisely, which is very difficult, the output signal of the Hall effect sensor 44 which should reflect the actual rotating speed of the sled motor may not be accurate. Also, the inaccurate Hall gain due to the imprecise distance between the magnetic plate 43 and the Hall-effect sensor 44 results in an improper control of the sled servo.

If the Hall gain has an accurate or nominal value, the target velocity profile and the actual velocity profile have almost the same magnitude as shown in FIG. 5. However, if the Hall gain is inaccurate, the target velocity profile and the actual velocity profile have different magnitudes at each instant, as shown in FIGS. 6 and 7.

Specifically, if the Hall gain is greater than the nominal value, the output signal of the Hall effect sensor which is controlled to be the same as the target speed is greater than the actual speed, as shown in FIG. 6. Therefore, the actual rotating speed of the sled motor is smaller than the target speed. Contrarily, if the Hall gain is smaller than the nominal value, the output signal of the Hall effect sensor is smaller than the actual speed, as shown in FIG. 7. In such a case, the actual rotating speed of the sled motor is larger than the target speed.

Conventionally, to reduce the effect of the variation of the gain and regulate the output signal of the Hall-effect sensor 44, a variable resistor 54 is provided, as shown in FIG. 4, for adjusting the gain of the amplifier 52. However, the adjustment using the variable resistor 54 is not very accurate, and therefore a significant error remains.

SUMMARY OF THE INVENTION

To solve the above problems, it is an object of the present invention to provide a method for controlling the speed of a sled motor of an optical disk drive which can minimize the variation of the actual speed of the sled motor by detecting the actual speed thereof, and adaptively adjust the target speed according to the detected actual speed using a microcomputer.

To accomplish the above object, there is provided a method of controlling the speed of a sled motor for an optical disk wherein the sled motor is first driven according to a predetermined target velocity profile stored in a microcomputer. Then, a frequency of a sinusoidal wave output by a Hall-effect sensor is detected, and it is determined whether the frequency of the sinusoidal wave is higher than a predetermined value. If the frequency of the sinusoidal wave is greater than the predetermined value, the target speed is incremented by a predetermined amount. On the other hand, if the frequency of the sinusoidal wave is smaller than the predetermined value, the target speed is decremented by the predetermined amount.

In the sled motor speed controlling method according to the present invention, the variation of the gain of the Hall-effect sensor can be compensated during the operation of the optical disk drive. As a result, a faster access time can be obtained since the actual rotating speed of the sled motor is detected by the microcomputer and the target speed is adaptively adjusted in accordance with the actual detected speed.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 1:
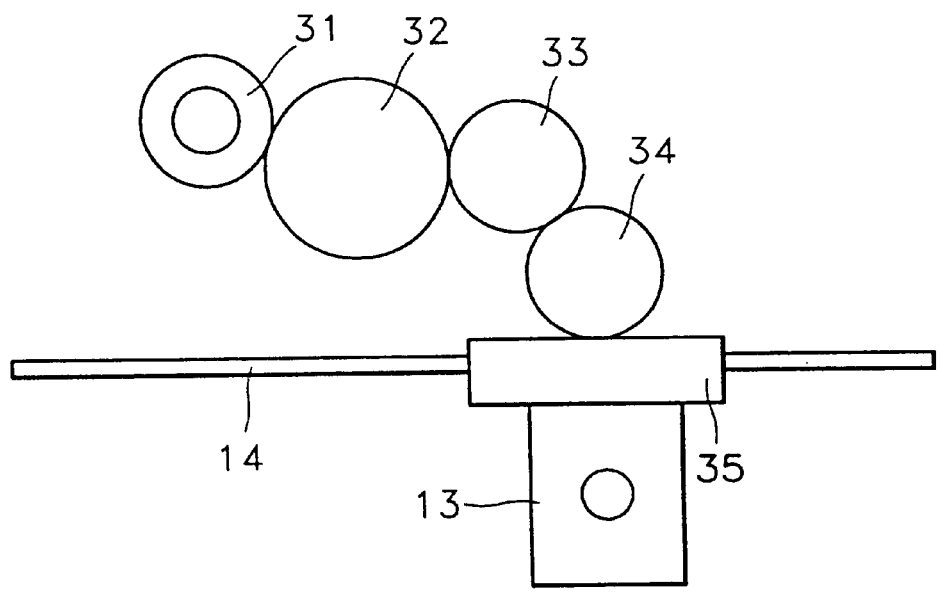
FIG. 1 shows the structure of a transferring mechanism of a pickup device in a CD-ROM drive.
Figure 2:
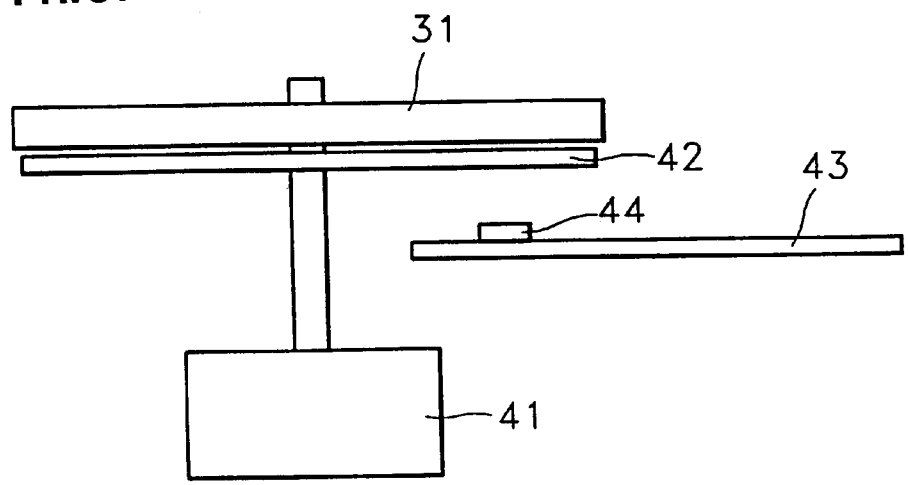
FIG. 2 shows the relative position of a sled motor and a Hall-effect sensor in the CD-ROM drive of FIG. 1.
Figure 3:
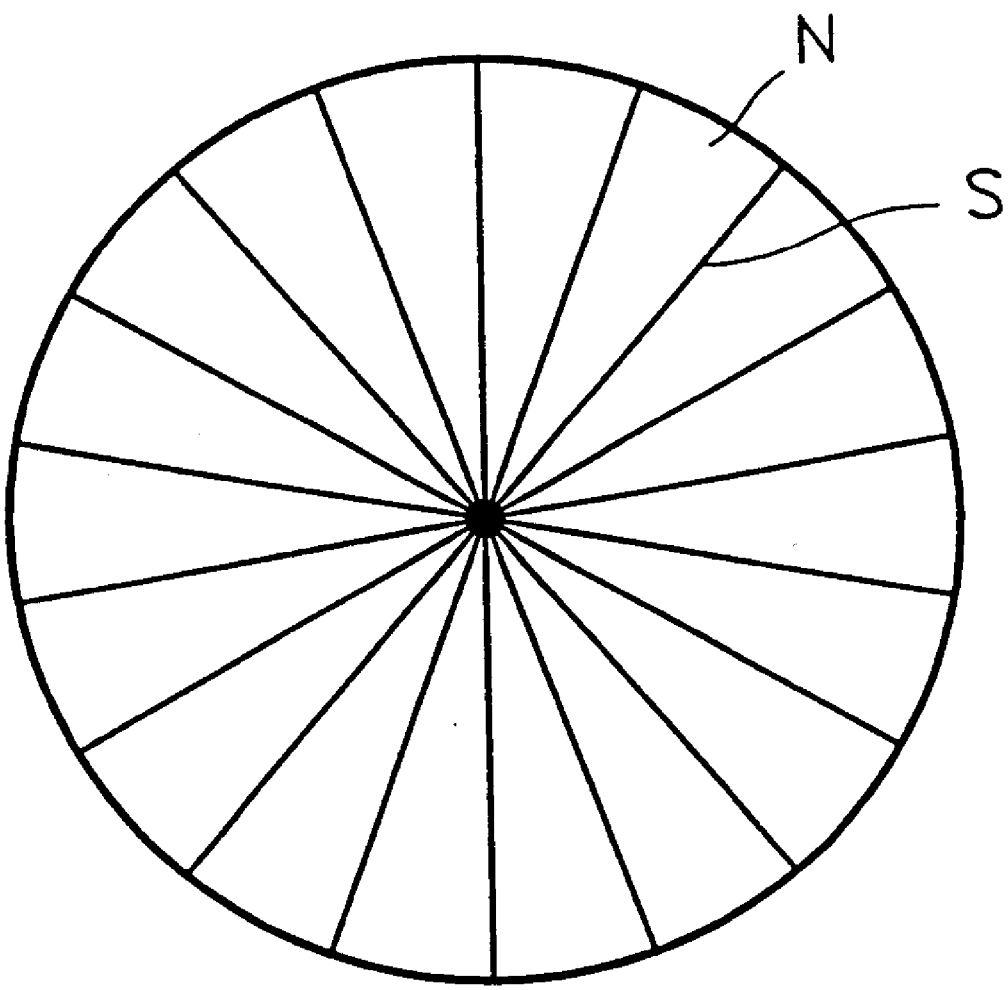
FIG. 3 shows the surface of a magnetic plate shown in FIG. 1, which is divided by alternating north and south magnetic poles.
Figure 4:
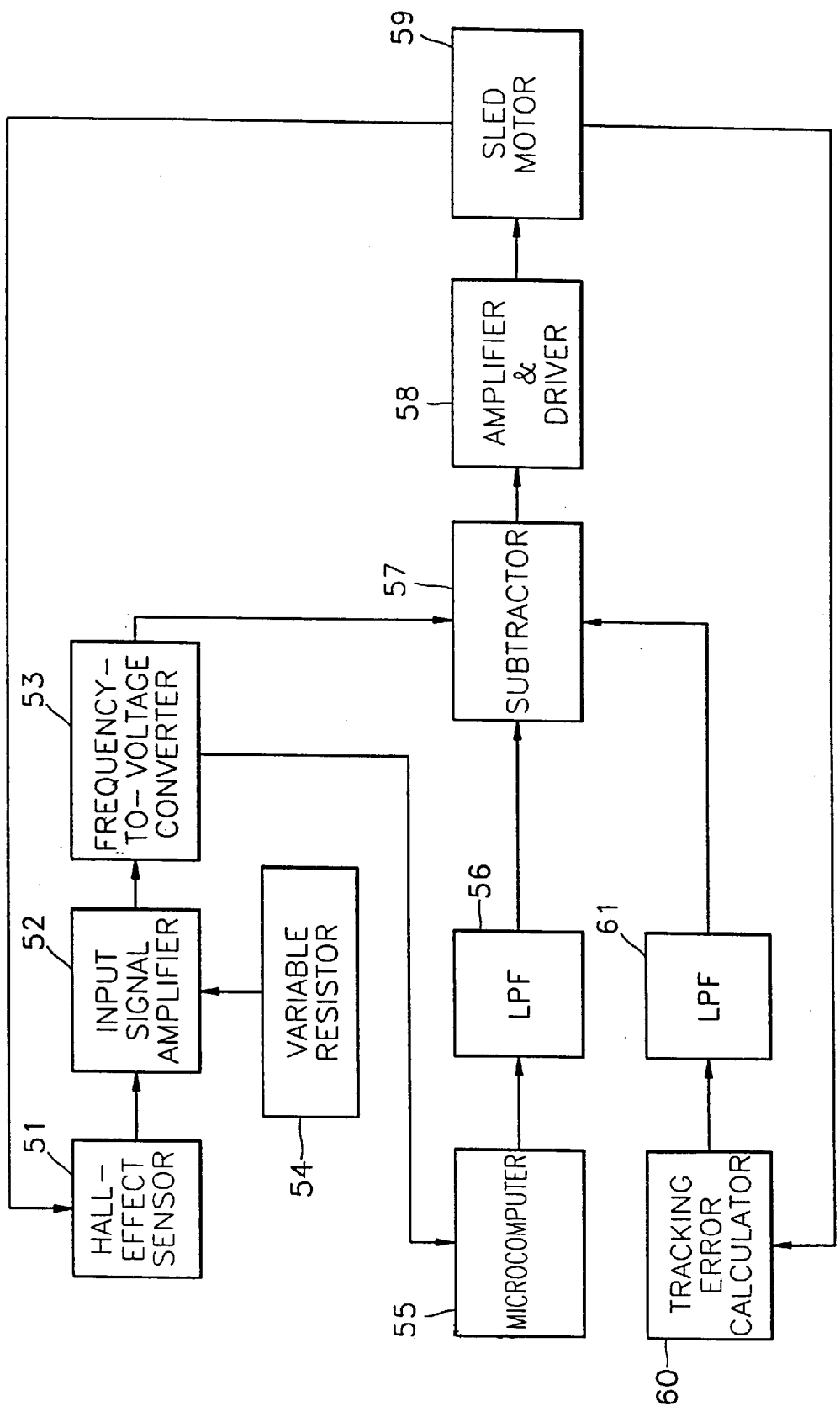
FIG. 4 is a block diagram of a circuit for controlling the speed of a sled motor in a typical CD-ROM drive.
Figure 5:
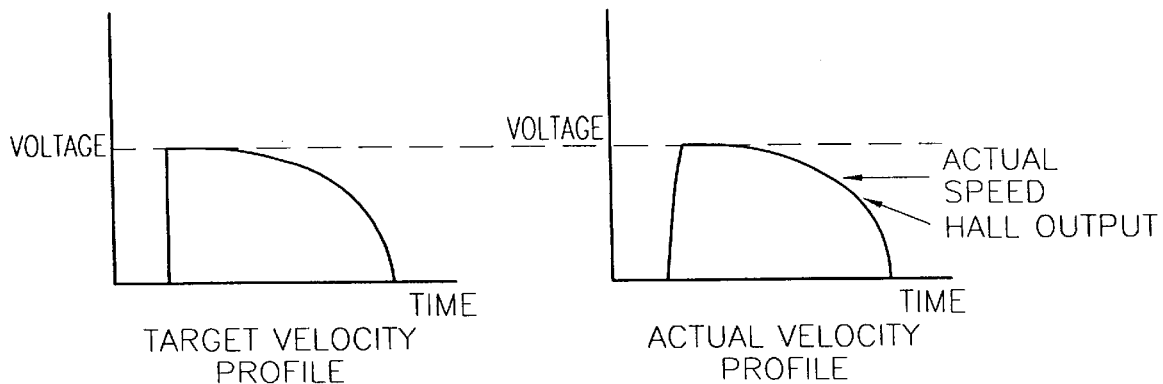
FIG. 5 illustrates a target velocity profile and a actual velocity profile when. the gain of the Hall-effect sensor has a nominal value.
Figure 6:
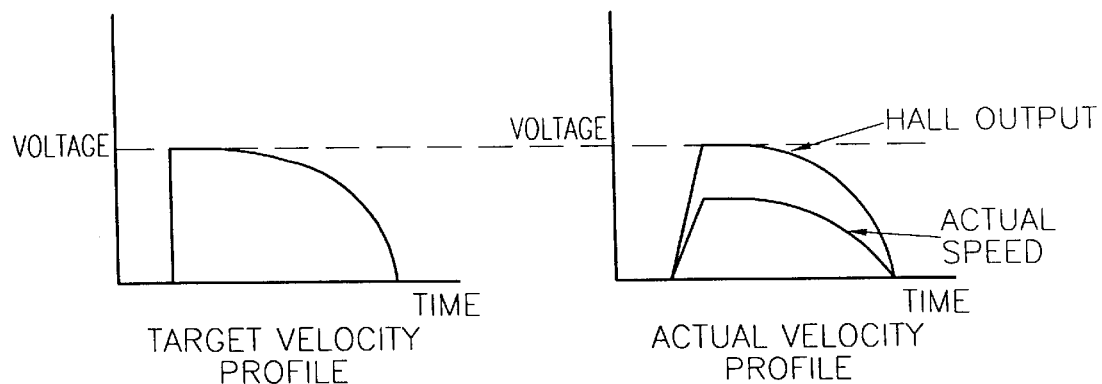
FIG. 6 illustrates a target velocity profile and an actual velocity profile when the gain of the Hall-effect sensor is higher than the nominal value.
Figure 7:
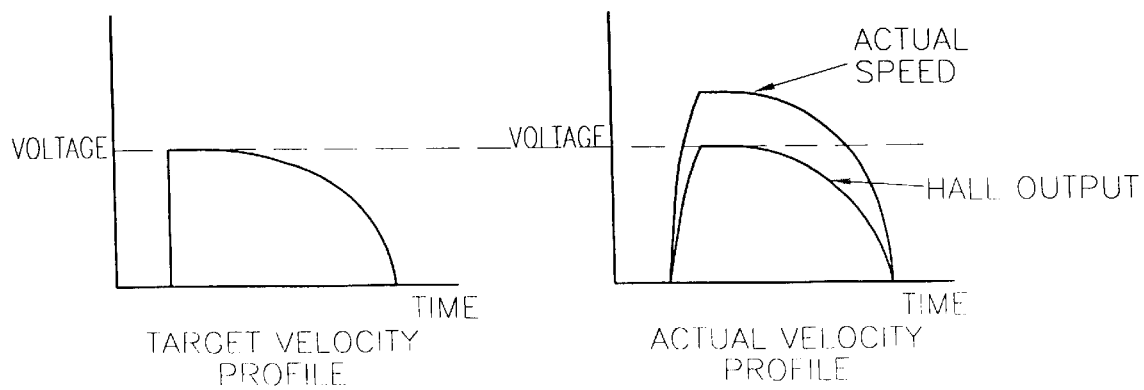
FIG. 7 illustrates a target velocity profile and an actual velocity profile when the gain of the Hall-effect sensor is lower than the nominal value.
Figure 8:
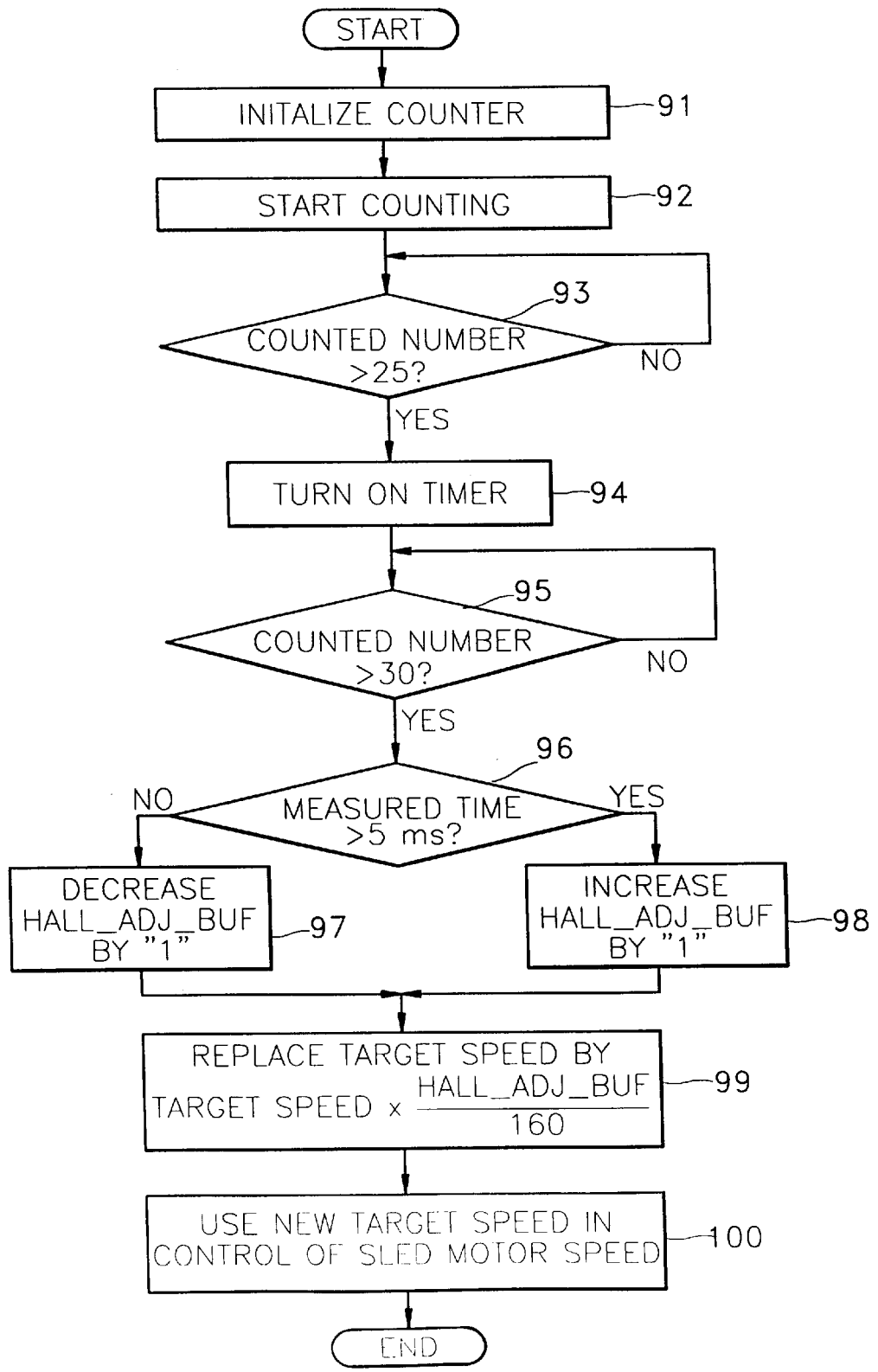
FIG. 8 is a flowchart outlining a method for controlling the speed of a sled motor for a CD-ROM drive according to the present invention.

FIG. 8 is a flowchart outlining a method for controlling the speed of a sled motor for a CD-ROM drive according to the present invention. First, a counter (not shown) which is electrically connected to the Hall-effect sensor 44 is cleared and initialized (step 91). Next, the sled motor 59 of FIG. 4 is driven to rotate at a predetermined target speed which is stored in the microcomputer 55 of FIG. 4, and the counter starts counting the number of sinusoidal waves output by the Hall-effect sensor 51 (step 92). Here, the counting of the sinusoidal waves is performed by counting the number of zero-crossings or a crossing of a predetermined level in the sinusoidal wave.

After the rotating speed of the sled motor 59 is stabilized, the number of sinusoidal waves is counted to determine the rotating speed of the sled motor 59. According to the inventor's experiments which were carried out for Hall-effect sensors having nominal gains, the rotating speed of the sled motor 59 stabilizes in 30 milliseconds (ms), at which instant the counted value of the counter is about 25. Also, it takes an average of 5 ms for the counted value to increase from 25 to 30. Thus, the rotating speed of the sled motor 59 can be determined by measuring the elapsed time for the counted value of the counter to increase from 25 to 30. The next steps 93 through 96 are performed based on the results of these experiments.

In step 93, it is determined whether the counted number is greater than 25. If the counted number is greater than 25 in step 93, a timer is turned on (step 94). Afterwards, it is determined whether the counted number is greater than 30 (step 95). When the counted number is greater than 30 in step 95, it is determined whether the time measured by the timer is greater than 5 ms (step 96). Then, the target speed of the sled motor 59 is incremented or decremented depending on the compared result in step 96. For this purpose, two variables are contemplated, one of which is Hall-effect sensor adjusting reference (HALL_ADJ_REF) and another one of which is Hall-effect sensor adjusting buffer (HALL_ADJ_BUF). The initial values of both of these variables are 160. The Hall-effect sensor adjusting buffer HALL_ADJ_BUF is incremented or decremented based on the time measured in the previous routine, which will be described in detail below, while the Hall-effect sensor adjusting reference HALL_ADJ_REF retains the same value throughout an iteration process.

If the measured time is determined to be greater than 5 ms in step 96, which represents that the gain of Hall-effect sensor is large and the actual rotating speed of the sled motor is low, the Hall-effect sensor adjusting buffer HALL_ADJ_BUF is increased by a predetermined amount, e.g., by one (step 98). Contrarily, if the measured time is determined to be less than 5 ms in step 96, which represents that the gain of Hall-effect sensor is small and the actual rotating speed of the sled motor is high, the Hall-effect sensor adjusting buffer HALL_ADJ_BUF is decreased by a predetermined amount, e.g., by one (step 97).

Next, a new target speed is obtained by multiplying the target speed by $$\frac{\text{HALL\_ADJ\_BUF}}{\text{HALL\_ADJ\_REF}}$$

(step 99). Then, the newly-obtained target speed is used by the microcomputer 55 to control the speed of the sled motor 59 (step 100). That is, the newly-obtained target speed value output from the microcomputer 55 of FIG. 4 is filtered by the low pass filter (LPF) 56, and then applied to the subtractor 57. Also, the frequency of the signal output by the Hall-effect sensor 51 is converted into a voltage in the frequency-to-voltage convertor 53. The subtractor 57 subtracts the new target speed value input via the LPF 56 and the voltage value output from the frequency-to-voltage convertor 53. Then, the resultant value for driving the sled motor 59 is amplified in an amplifier and driver 58.

Figure 9:
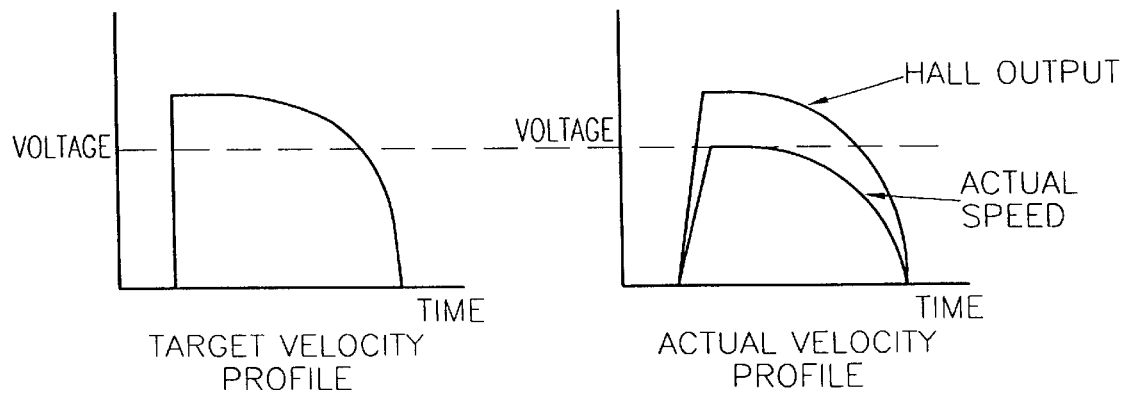
FIG. 9 illustrates a target velocity profile and an actual velocity profile when the speed of a sled motor is controlled according to the present invention in case that the gain of the Hall-effect sensor is higher than the nominal value.
Figure 10:
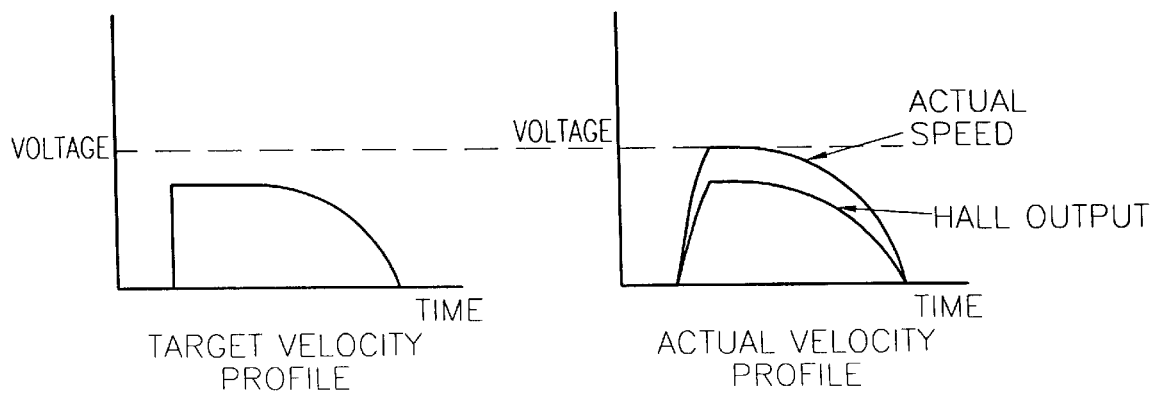
FIG. 10 illustrates a target velocity profile and an actual velocity profile when the speed of a sled motor is controlled according to the present invention in case that the gain of the Hall-effect sensor is lower than the nominal value.

Therefore, in the case where the gain of the Hall-effect sensor is higher than the nominal value, the target speed is increased, and thus the actual rotating speed of the sled motor is increased to the extent that the output signal of the Hall-effect sensor will become the same as the target speed, as shown in FIG. 9. Similarly, in the case where the gain of the Hall-effect sensor is lower than the nominal value, the target speed is decreased, and thus the actual rotating speed of the sled motor is decreased to the extent that the output signal of the Hall-effect sensor will become the same as the target, as shown in FIG. 10.

The adjustment of the target speed to control the actual rotating speed of the sled motor is carried out whenever data access is performed. Also, each time the target speed is adjusted, the Hall-effect sensor adjusting buffer HALL_ADJ_BUF is increased or decreased based on the value adjusted in the previous adjustment. Thus, the difference between the target speed and the actual rotating speed is decreased gradually.

As described above, in the method for controlling the speed of the sled motor for a CD-ROM drive according to the present invention, the microcomputer detects the actual rotating speed of the sled motor, and adaptively adjusts the target speed according to the detected actual rotating speed, thereby minimizing the variation of the actual rotating speed of the sled motor. Therefore, even though there exists some variation in the gain of the Hall-effect sensor among thee produced CD-ROM drive systems, the variation of the gain can be compensated during the operation of the CD-ROM drive, and thus faster access time can be obtained.

The above description has been provided in terms of a CD-drive. However, it is to be understood that the present invention can be applied to any optical disk system in which frequent data access is carried out.

What is claimed is:

1. A method of controlling the speed of a sled motor for an optical disk, comprising the steps of:

(a) driving the sled motor according to a predetermined target velocity profile, which determines a target speed, stored in a microcomputer;

(b) detecting a frequency of a sinusoidal wave output by a Hall-effect sensor and determining whether the frequency of the sinusoidal wave is greater or smaller than a predetermined value;

(c) incrementing the target speed by a predetermined amount when the frequency of the sinusoidal wave is greater than the predetermined value in said step (b); and (d) decrementing the target speed by the predetermined amount when the frequency of the sinusoidal wave is smaller than the predetermined value in said step (b).

2. A method of controlling the speed of a sled motor for an optical disk as claimed in claim 1, wherein said step (b) comprises the steps of:

(b1) clearing and initializing a counter which is electrically connected to the Hall-effect sensor;

(b2) counting a number of sinusoidal waves using the counter until a counted number of the counter exceeds a first predetermined number which represents that the speed of the sled motor is stabilized;

(b3) measuring a time interval elapsed from a timing at which it is determined that the counted number exceeds the first predetermined number in said step (b2) to a timing at which the counted number reaches a second predetermined number; and (b4) determining whether the time interval measured in said step (b3) is less than or greater than a predetermined time interval, wherein it is determined that the frequency of the sinusoidal wave is higher than the predetermined value when the time interval measured in said step (b3) is less than the predetermined time interval and that the frequency of the sinusoidal wave is lower than a predetermined value when the time interval measured in said step (b3) is greater than the predetermined time interval.

3. A method of controlling the speed of a sled motor for an optical disk as claimed in claim 1, wherein said step (c) comprises the steps of:

(c1) incrementing a buffer value; and (c2) multiplying the target speed by the buffer value and dividing the target speed by a reference value; and wherein said step (d) comprises the steps of:

(d1) decrementing said buffer value; and (d2) multiplying the target speed by the buffer value and dividing the target speed by the reference value.

* * * * *